US012621749B2

(12) United States Patent
Höglund et al.

(10) Patent No.: US 12,621,749 B2
(45) Date of Patent: May 5, 2026

(54) METHOD AND SYSTEM FOR ENABLING AND DISABLING EARLY DATA TRANSMISSION

(71) Applicant: TELEFONAKTIEBOLAGET LM ERICSSON (PUBL), Stockholm (SE)

(72) Inventors: Andreas Höglund, Solna (SE); Magnus Stattin, Upplands Väsby (SE); Tuomas Tirronen, Helsinki (FI); Emre Yavuz, Stockholm (SE); Yutao Sui, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1727 days.

(21) Appl. No.: 16/759,454

(22) PCT Filed: Oct. 25, 2018

(86) PCT No.: PCT/IB2018/058338
§ 371 (c)(1),
(2) Date: Apr. 27, 2020

(87) PCT Pub. No.: WO2019/082122
PCT Pub. Date: May 2, 2019

(65) Prior Publication Data
US 2023/0199617 A1 Jun. 22, 2023

Related U.S. Application Data

(60) Provisional application No. 62/577,463, filed on Oct. 26, 2017.

(51) Int. Cl.
*H04W 48/02* (2009.01)
*H04W 24/10* (2009.01)
*H04W 74/0833* (2024.01)

(52) U.S. Cl.
CPC ........... *H04W 48/02* (2013.01); *H04W 24/10* (2013.01); *H04W 74/0833* (2013.01)

(58) Field of Classification Search
CPC .. H04W 48/02; H04W 24/10; H04W 74/0833
See application file for complete search history.

(56) References Cited

U.S. PATENT DOCUMENTS

2017/0180567 A1* 6/2017 Sharma ................... H04L 45/22
2020/0037345 A1* 1/2020 Ryoo ................ H04W 74/0833
(Continued)

FOREIGN PATENT DOCUMENTS

CN 106416375 A 2/2017

OTHER PUBLICATIONS

3GPP TS 36.331, V14.4.0, Sep. 2017 (Year: 2017).*
(Continued)

*Primary Examiner* — Chuong M Nguyen
(74) *Attorney, Agent, or Firm* — Ericsson Inc.

(57) ABSTRACT

A communication system for enabling/disabling EDT comprises UEs and a network node. The network node is configured to collect measurements regarding cell information, determine whether EDT is allowed to be used by the UEs to transmit data prior to completing an access procedure, and send a message comprising an EDT indication instructing whether EDT is allowed to be used by the UEs. The UE is configured to initiate a transmission to the network node, receive the message comprising the EDT indication, and determine whether EDT is allowed to be used based on the EDT indication. The communication system may be able to enable or disable EDT for the UE based the status of cell, such that the communication system may avoid a resource waste caused by an early indication in Msg1 or a larger uplink grant in Msg2, and further improve the network performance.

26 Claims, 16 Drawing Sheets

(56) References Cited

U.S. PATENT DOCUMENTS

| | | | |
|---|---|---|---|
| 2020/0037367 A1* | 1/2020 | Kim | H04W 74/006 |
| 2022/0295403 A1* | 9/2022 | Shrestha | H04W 4/70 |

OTHER PUBLICATIONS

Kyocera "Details of Early data transmission for eFeMTC", 3GPP R2-1710791, Oct. 9-13, 2017 (Year: 2017).*

Kyocera, Details of Early data transmission for eFeMTC, R2-1710791, 3GPP TSG-RAN WG2 #99bis, Prague, Czech Republic, Oct. 9-13, 2017.

Ericsson, Report from Rel-15 MTC session, R2-1711836, 3GPP TSG-RAN WG2 Meeting #99bis, Prague, Czech Republic, Oct. 9-13, 2017.

Ericsson, General aspects of early data transmission, Tdoc R2-1710523, 3GPP TSG-RAN WG2 #99bis, Prague, Czech Republic, Oct. 9-13, 2017.

3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331 V14.4.0 (Sep. 2017).

Qualcomm Incorporated, Email discussion report: [99#45][NB-IoT/MTC] Early data transmission, R2-1710888, 3GPP TSG-RAN WG2 Meeting #99bis, Prague, Czech Republic, Oct. 9-13, 2017.

ZTE: "Further consideration on early data transmission in eFeMTC and FeNB-IoT". 3GPP TSG-RAN WG2 Meeting#99, R2-1710987 Prague, Czech, Oct. 9-13, 2017.

* cited by examiner

1300

1400

1600 Network node

1610
Collecting Unit

1620
Determining Unit

1630
Sending Unit

FIGURE 16

METHOD AND SYSTEM FOR ENABLING AND DISABLING EARLY DATA TRANSMISSION

This application is a 371 of International Application No. PCT/IB2018/058338, filed Oct. 25, 2018, which claims the benefit of U.S. Application No. 62/577,463, filed Oct. 26, 2017, the disclosures of which are fully incorporated herein by reference.

TECHNICAL FIELD

Particular embodiments relate to the field of enabling or disabling early data transmission; and more specifically, to methods, apparatus and systems for enabling and disabling early data transmission for a particular cell or user equipment by including an indication in a system information message.

BACKGROUND

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories, as in Cat-M1, Cat-M2, supporting reduced bandwidth of up to 6 and 24 physical resource blocks (PRBs), and Narrowband IoT (NB-IoT) UEs providing a new radio interface, with UE categories Cat-NB1 and Cat-NB2.

The LTE enhancements introduced in 3GPP Release 13, 14, and 15 for MTC would be referred as "eMTC", including but not limited to support for bandwidth limited UEs, Cat-M1/M2, and support for coverage enhancements. This is to separate discussions from NB-IoT used for any Release, although the supported features are similar on a general level.

For both eMTC and NB-IoT, Cellular IoT EPS User Plane optimization and Cellular IoT EPS Control Plane optimization signaling reductions were also introduced in Release 13. The former, here referred to as UP-solution, allows the UE to resume a previously stored RRC connection, thus also known as RRC Suspend/Resume. The latter, here referred to as CP-solution, allows the transmission of user-plane data over non-access stratum, i.e. DoNAS.

For 3GPP Release 15, new work items (WIs) for Even further enhanced MTC for LTE (LTE_eMTC4) and Further NB-IoT enhancements (NB_IOTenh2) target eMTC and NB-IoT enhancements, respectively. The new WIs for LTE_eMTC4 here is referred to as WI_eMTC, and the new WIs for NB_IOTenh2 here is referred as WI_NBIOT. In both of these, one of the goals for a WI is to reduce UE power consumption and latency through introducing possibilities to send data as early as possible during the Random Access (RA) procedure.

WI_eMTC supports early data transmission and evaluates power consumption, latency gain, and specifies necessary support for downlink (DL)/uplink (UL) data transmission on a dedicated resource during the RA procedure, e.g. after physical random access channel (PRACH) transmission and before the RRC connection setup is completed, at least in the RRC Suspend/Resume case.

WI_NBIOT evaluates power consumption, latency gain, and specifies necessary support for DL/UL data transmission on a dedicated resource during the RA procedure, after NPRACH transmission and before the RRC connection setup is completed.

During RAN2 #99, several contributions on early data transmission (EDT) were discussed, and one of the agreements is to support early UL data transmission in Msg4 for Release 13 UP solution.

FIG. 1 illustrates a contention-based RA procedure from TS 36.300, the messages in the RA procedure are commonly referred to as message 1 (Msg1) through message 4 (Msg4).

It is commonly agreed that EDT can be enabled for UL Msg3 only, or DL Msg4 only, or both Msg3 and Msg4 depending on actual use cases. In 3GPP, it has been agreed that it should be possible to transmit early data in Msg3 and/or Msg4. Existing solutions for realizing the early data transmission concept have recently been presented in prior art for UP solution. In existing solutions, the UE can indicate its intention of using EDT by the way it selects the preamble in Msg1. However, this requires some sort of preamble partitioning, which has negative impact on (N)PRACH performance. When there is only early DL data in Msg4, for example the UE does not have UL data to send in Msg3, it is desired to avoid such early indication in Msg1 and the partitioning issue. In addition, in UP solution, one approach is to provide a larger UL grant in Msg2 in addition to legacy UL grant to allow for the transmission of data in Msg3. However, when there is no UL data to transmit in Msg3, such provisioned resources are wasted.

SUMMARY

To address the foregoing problems with existing solutions, disclosed are methods, a user equipment (UE), a network node, and a communication system for early data transmission (EDT) by including an EDT indication in a system information message to enable or disable EDT for the UE. The present disclosure implements a solution to enable or disable the usage of EDT based on the status of a cell or the UE to avoid a collision at the UE or a waste of resources.

Several embodiments are elaborated in this disclosure. According to a first embodiment of a method for enabling and disabling EDT at a UE, the method comprises initiating, from a UE, a transmission to a network node, wherein the UE is in a first cell. The method additionally comprises receiving a first message comprising a first EDT indication from the network node. The method further comprises determining whether the UE is allowed to use EDT to transmit data prior to completing an access procedure based on the first EDT indication, wherein the first EDT indication is cell-specific and applies to UEs in the first cell.

In one embodiment, the method further comprises receiving a second message comprising a second EDT indication. In one embodiment, the second EDT indication is UE-specific and instructs whether the UE is allowed to use EDT.

In one embodiment, the first EDT indication is added in a system information message. In one embodiment, the first EDT indication is added in System Information Block Type 14 (SIB14), SIB1, SIB2, SIB22, an existing SIB, a new SIB, or a Master Information Block (MIB).

In one embodiment, the first EDT indication is added in PRACH-Config, BACH-ConfigCommon, NPRACH-ConfigSIB-NB, or RACH-ConfigCommon-NB information element.

In one embodiment, the first EDT comprises access barring information. In another embodiment, the first EDT indication further comprises grouping information used to configure a set of random access preambles indicated in the first EDT indication. In yet another embodiment, the first EDT indication comprises a configuration in which no preambles are allocated for the first EDT indication.

In one embodiment, the second EDT indication comprises a flag combined with a cell-specific EDT configuration. In another embodiment. The cell-specific EDT configuration is overridden when the specific UE is indicated.

In one embodiment, the method further comprises receiving an EDT configuration in response to determining whether the UE is allowed to use EDT, and configuring the UE based on the EDT configuration. In another embodiment, the EDT configuration is valid as long as the UE is in the first cell.

In one embodiment, the second EDT indication instructs the UE to use EDT for a specific period of time. In another embodiment, the second EDT indication instructs a specific preamble or a resource to use for EDT. In yet another embodiment, either one of the first EDT indication and the second EDT indication instructs the UE to use EDT in Msg3, Msg4, or both Msg3 and Msg4.

According to a second embodiment of a method for enabling and disabling EDT at a network node, the method comprises collecting measurements regarding cell information of a first cell. The method additionally comprises determining whether EDT is allowed to be used by UEs in the first cell to transmit data prior to completing an access procedure based on the collected measurements. The method further comprises sending, to the UEs in the first cell, a first message comprising a first EDT indication instructing whether EDT is allowed to be used by the UEs in the first cell to transmit data prior to completing the access procedure in response to the determination.

In one embodiment, the method further comprises sending a second message comprising a second EDT indication based on the collected measurements. In one embodiment, the second EDT indication is UE-specific and instructs whether a specific UE is allowed to use EDT.

In one embodiment, the collected measurement regards at least one of a cell load, a cell size, and a congestion at the UE. In another embodiment, the collected measurement regards at least one of a random access collision rate, a number of access attempts per a time unit, a physical random access channel (PRACH) configuration, a number of preambles allocated, a new update from the UE, an existing update from the UE, a maximum coverage enhancement configured in a cell, and a collision of a UE-specific subcarrier.

In another embodiment, a communication system for enabling and disabling EDT comprises UEs and a network node. The network node comprises at least one processing circuitry configured to collect measurements regarding cell information of a first cell, determine whether EDT is allowed to be used by the UEs in the first cell to transmit data prior to completing an access procedure based on the collected measurements, and send, to the UEs in the first cell, a first message comprising a first EDT indication instructing whether EDT is allowed to be used by the UEs in the first cell to transmit data prior to completing the access procedure in response to the determination. The UEs comprises at least one processing circuitry individually configured to initiate a transmission to the network node, receive the first message comprising the first EDT indication from the network node, and determine whether EDT is allowed to be used in the first cell to transmit data prior to completing the access procedure based on the first EDT indication.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may offer an efficient route to enable or disable EDT to use in a cell for a UE, by including an EDT indication generated by cell information in a system information message. With these methods, the EDT indication may enable or disable EDT for the UE in Msg3, Msg4, or both Msg3 and Msg4, therefore, the methods may prevent the early indication in Msg1 or Msg2 when there is no uplink data transmission in Msg3, so that the resources may be utilized efficiently. Furthermore, the methods may also include a UE-specific EDT indication generated by a status of the UE in a paging message, such that possible congestion or collision at the UE may be avoided by disabling EDT for the UE.

The present embodiments provide a cell-specific EDT indication in a system information message to instruct a UE whether EDT is allowed to be used based on a cell status, such that the resource does not waste. The present embodiments further provide a UE-specific EDT indication in paging message to prevent a congestion at the UE.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 16 illustrates a block schematic of an example network node, in accordance with certain embodiments.

DETAILED DESCRIPTION

Figure 1:
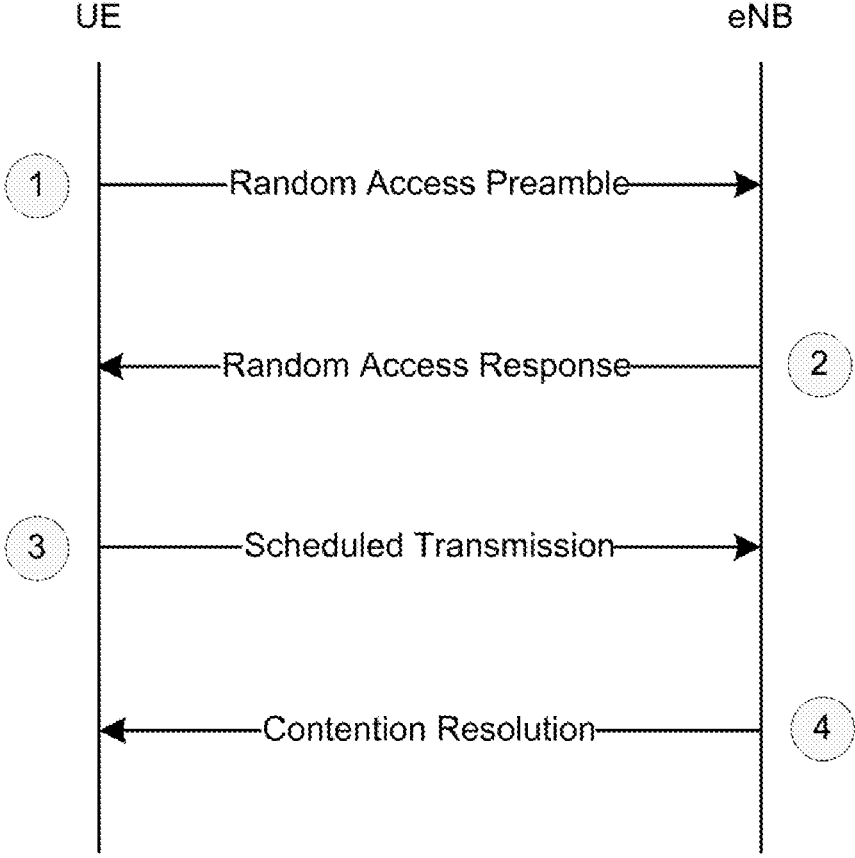
FIG. 1 illustrates an example contention-based random access procedure.

In 3GPP radio access networks, when messages transmitted in an access procedure are used to indicate a UE to use early data transmission (EDT), a resource waste may be caused. For example, an early data indication in Msg1 sent from the UE or a larger UL grant in Msg2 received by the UE may waste resources, especially when there is no uplink data transmission in Msg3. Therefore, particular embodiments of the present disclosure propose a method to enabling and disabling EDT by including an EDT indication in a system information message, such that the UE may be informed and configured to use EDT or not without the resource waste when there is no uplink data transmission in Msg3. Furthermore, the EDT indication may further be sent together with access barring information, a configuration specific to the EDT indication, and other necessary information. Therefore, the network may benefit from better resource usage.

In addition, the EDT indication of the present disclosure may be generated and evaluated by a network node based on cell status. Furthermore, the EDT indication of the present disclosure may be bonded to UE coverage enhancement level. Therefore, the EDT indication may be turned on or off based on both the cell status and the UE status to prevent possible congestion and future collision at the UE.

To address by the above described problems with prior solutions, there is proposed herein to introduce a generic EDT indication for the UE to be included in messages instructing UEs to use EDT or not. The messages may be a system information message or a paging message based on the type of the EDT indication. With the differentiation to include the EDT indication in a corresponding message, the network node may choose an appropriate channel to deliver the message, and thus improve the performance of the network.

In 3GPP, EDT may be enabled for UL Msg3 only, or DL Msg4 only, or both Msg3 and Msg4 depending on actual use cases. The background for the agreement in RAN2 #99-Bis is that some companies want to introduce control on a per-UE basis to use the EDT feature. In some embodiments, an authorization mechanism may be introduced in the EDT enabling/disabling procedure. UE authorization typically works in the way that it is configured over NAS signaling between UE and MME whether the UE is allowed to use a certain feature. The UE authorization would then be stored in UE context in the MME as well as in the UE. Furthermore, an additional signaling may be required to eNB in case that eNB is involved in the feature. This is the case for EDT which is an eNB-controlled feature. An authorization solution therefore may introduce a lot of unnecessary signaling.

In addition, the issue that the present disclosure addresses herein is not only that certain UEs should be allowed to use the EDT feature, and if other UEs use it the performance of other UEs would be reduced for a first group of UEs. It is instead that if other UEs use the EDT feature, their data transmissions will be quicker overall and more efficient and leaving more radio resources to the first group of UEs and overall higher capacity. There is one exception to the aforementioned scenario, with the EDT feature, the transmission of data is contention based. That is, e.g. for EDT transmission, if the data in Msg3, there may be other UEs transmitting on the same radio resources leading to a collision and re-transmissions of Msg3 which is costly in terms of radio resources, UE power consumption, and latency. Therefore, particular embodiments of the present disclosure are to be able turn off the use of EDT in a cell when there is a high risk of collisions. Particular embodiments which are cell-specific are relevant for EDT in Msg3 at high load.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 2:
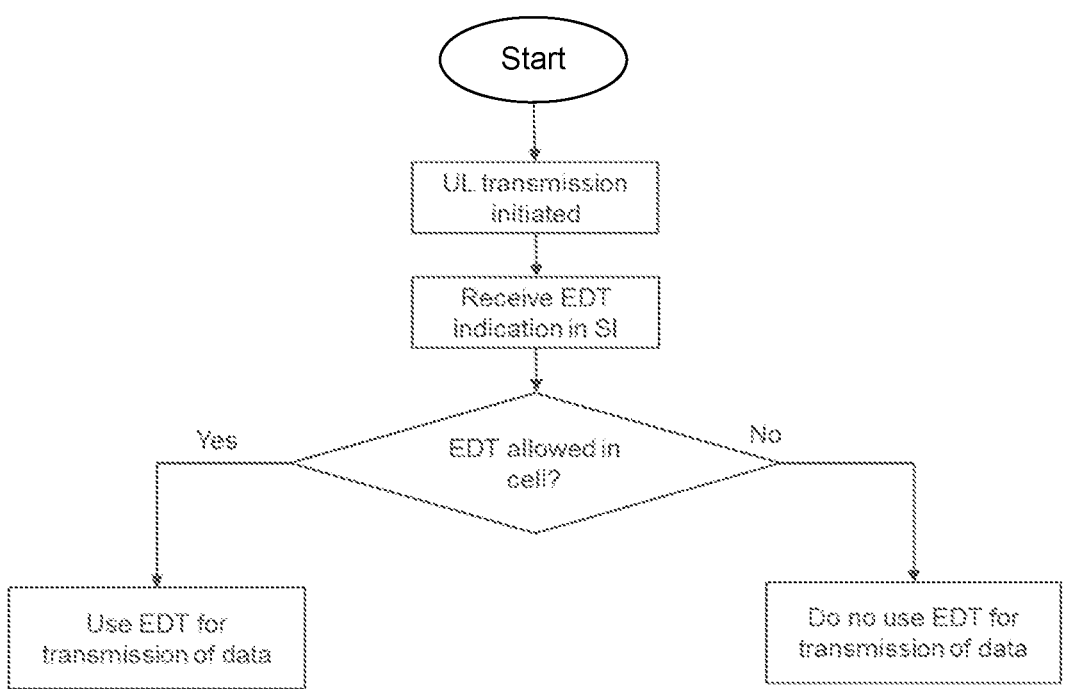
FIG. 2 illustrates a flow diagram of an example method performed at a user equipment, in accordance with certain embodiments.

FIG. 2 illustrates an example method performed at a user equipment, in accordance with certain embodiments. The UE initiates an uplink transmission, receives an EDT indication in a system information message, determines whether EDT is allowed in cell, and uses EDT for transmission of data when the EDT indication instructs that EDT is allowed in the cell, or does not use EDT for transmission of data when the EDT indication instructs that EDT is not allowed in the cell. The present disclosure provides a method to address the problems of resource waste and collision at the cell, and to be able to turn the EDT feature on and off with an indication in system information. For example, if dual-grant is provided for certain preambles, the UE would know if it would be allowed to use the larger second grant for Msg3. This may make the enabling/disabling cell-specific. Since the UE needs to have this information prior to transmission, it may make sense to group the indication with access barring information. In one embodiment, the indication may be put in SystemInformationBlockType14. When the indication in SystemInformationBlockType14 is used for eMTC, SystemInformationBlockType14 may be referred as SIB14. When the indication in SystemInformationBlockType14 is used for NB-IoT, SystemInformationBlockType14 may be referred as SIB14-NB.

Example abstract syntax notation one (ASN. 1) of the particular embodiment used for NB-IoT is given in Table 1 below. The information elements (IEs) of SystemInformationBlockType14-NB may contain the access barring parameters.

TABLE 1

| SIB14-NB information elements |
|---|

```
-- ASN1START
SystemInformationBlockType14-NB-r13 ::= SEQUENCE {
    ab-Param-r13                        CHOICE {
        ab-Common-r13                       AB-Config-NB-r13,
        ab-PerPLMN-List-r13                 SEQUENCE (SIZE (1..maxPLMN-r11)) OF AB-ConfigPLMN-NB-
r13
    }                                                           OPTIONAL,    -- Need OR
    lateNonCriticalExtension            OCTET STRING            OPTIONAL,
    ...,
    [[ EDTenabled-r15                   ENUMERATED {true}       OPTIONAL,      -- Need OR ]]
}
AB-ConfigPLMN-NB-r13 ::=            SEQUENCE {
    ab-Config-r13                       AB-Config-NB-r13        OPTIONAL -- Need OR
}
AB-Config-NB-r13 ::=               SEQUENCE {
    ab-Category-r13                     ENUMERATED      {a, b, c},
    ab-BarringBitmap-r13                BIT STRING      (SIZE(10)),
    ab-BarringForExceptionData-r13      ENUMERATED      {true}   OPTIONAL,      -- Need OP
    ab-BarringForSpecialAC-r13          BIT STRING      (SIZE(5))
}
-- ASN1STOP
```

In yet another embodiment, the indication may be added to MasterInformationBlock (MIB). Example ASN. 1 of the particular embodiment used for eMTC is given in Table 2 below.

TABLE 2

| MIB information elements |
|---|

```
-- ASN1START
MasterInformationBlock ::=          SEQUENCE {
    dl-Bandwidth                        ENUMERATED {
                                            n6, n15, n25, n50, n75, n100},
    phich-Config                        PHICH-Config,
    systemFrameNumber                   BIT STRING (SIZE (8)),
    schedulingInfoSIB1-BR-r13           INTEGER (0..31),
```

TABLE 2-continued

| MIB information elements |
|---|

```
    EDTenabled                          BOOLEAN,
    spare                               BIT STRING (SIZE (4))
}
-- ASN1STOP
```

In yet another embodiment, the indication may be put in SystemInformationBlockType1 (SIB1). When the indication in SystemInformationBlockType1 is used for eMTC, SystemInformationBlockType1 may be referred as SIB1-BR. When the indication in SystemInformationBlockType1 is used for NB-IoT, SystemInformationBlockType1 may be referred as SIB1-NB. Example ASN. 1 of the particular embodiment used for NB-IoT is given in Table 3 below.

TABLE 3

| SIB1-NB information elements |
|---|

```
-- ASN1START
SystemInformationBlockType1-NB ::=      SEQUENCE {
    hyperSFN-MSB-r13                        BIT STRING (SIZE (8)),
    cellAccessRelatedInfo-r13               SEQUENCE {
        plmn-IdentityList-r13                   PLMN-IdentityList-NB-r13 ,
        trackingAreaCode-r13                    TrackingAreaCode ,
        cellIdentity-r13                        CellIdentity,
        cellBarred-r13                          ENUMERATED {barred, notBarred},
        intraFreqReselection-r13                ENUMERATED {allowed, notAllowed}
    },
    cellSelectionInfo-r13                   SEQUENCE {
        q-RxLevMin-r13                          Q-RxLevMin,
        q-QualMin-r13                           Q-QualMin-r9
    },
    p-Max-r13                               P-Max                       OPTIONAL,        -- Need OP
    freqBandIndicator-r13                   FreqBandIndicator-NB-r13,
    freqBandInfo-r13                        NS-PmaxList-NB-r13          OPTIONAL,        -- Need OR
    multiBandInfoList-r13                   MultiBandInfoList-NB-r13    OPTIONAL,        -- Need OR
    downlinkBitmap-r13                      DL-Bitmap-NB-r13            OPTIONAL,        -- Need OP,
    eutraControlRegionSize-r13              ENUMERATED      {n1, n2, n3}    OPTIONAL,        -- Cond
inband
    nrs-CRS-PowerOffset-r13                 ENUMERATED      {dB-6,          dB-4dot77,      dB-3
                                                            dB-1dot77,      dB0,            dB1,
                                                            dB1dot23,       dB2,            dB3,
                                                            dB4,            dB4dot23,       dB5,
                                                            dB6,            dB7,            dB8,
                                                            dB9}            OPTIONAL,       -- Cond inband-
SamePCI
    schedulingInfoList-r13                  SchedulingInfoList-NB-r13 ,
```

TABLE 3-continued

| SIB1-NB information elements |
|---|

```
    si-WindowLength-r13              ENUMERATED     {ms160,        ms320,        ms480,        ms640,
                                                     ms960,         ms1280,       ms1600,       spare1},
    si-RadioFrameOffset-r13          INTEGER (1..15)          OPTIONAL,                      -- Need OP
    systemInfoValueTagList-r13       SystemInfoValueTagList-NB-r13                 OPTIONAL,         -- Need OR
    lateNonCriticalExtension         OCTET STRING                                  OPTIONAL,
    nonCriticalExtension             SystemInformationBlockType1-NB-v1350                OPTIONAL
}
SystemInformationBlockType1-NB-v1350 ::=    SEQUENCE {
    cellSelectionInfo-v1350          CellSelectionInfo-NB-v1350                    OPTIONAL,         -- Cond Qrxlevmin
    nonCriticalExtension             SystemInformationBlockType1-NB-v1430                OPTIONAL
}
SystemInformationBlockType1-NB-v1430 ::=    SEQUENCE {
    cellSelectionInfo-v1430          CellSelectionInfo-NB-v1430                    OPTIONAL,         -- Need OR
    nonCriticalExtension             SystemInformationBlockType1-NB-v15xy                OPTIONAL
}
SystemInformationBlockType1-NB-v15xy ::=    SEQUENCE {
    EDTenabled-r15                   ENUMERATED {true}                             OPTIONAL,         -- Need OR
    nonCriticalExtension             SEQUENCE { }                                  OPTIONAL
}
PLMN-IdentityList-NB-r13 ::=         SEQUENCE (SIZE (1..maxPLMN-r11)) OF PLMN-IdentityInfo-NB-r13
PLMN-IdentityInfo-NB-r13            SEQUENCE {
    plmn-Identity-r13                   PLMN-Identity,
    cellReservedForOperatorUse-r13      ENUMERATED {reserved, notReserved},
    attachWithoutPDN-Connectivity-r13   ENUMERATED {true}                   OPTIONAL        -- NeedOP
}
SchedulingInfoList-NB-r13 ::= SEQUENCE (SIZE (1..maxSI-Message-NB-r13)) OF SchedulingInfo-NB-r13
SchedulingInfo-NB-r13::=             SEQUENCE {
    si-Periodicity-r13                  ENUMERATED     {rf64, rf128, rf256, rf512,
                                                        rf1024, rf2048, rf4096, spare},
    si-RepetitionPattern-r13            ENUMERATED     {every2ndRF, every4thRF, every8thRF, every16thRF},
    sib-MappingInfo-r13                 SIB-MappingInfo-NB-r13,
    si-TB-r13                           ENUMERATED     {b56, b120, b208, b256, b328, b440, b552, b680)
}
SystemInfoValueTagList-NB-r13 ::=       SEQUENCE (SIZE (1.. maxSI-Message-NB-r13)) OF
                                           SystemInfoValueTagSI-r13
SIB-MappingInfo-NB-r13 ::=              SEQUENCE (SIZE (0..maxSIB-1)) OF SIB-Type-NB-r13
SIB-Type-NB-r13 ::=                     ENUMERATED {
                                           sibType3-NB-r13, sibType4-NB-r13, sibType5-NB-r13,
                                           sibType14-NB-r13, sibType16-NB-r13, sibType15-NB-r14,
                                           sibType20-NB-r14, sibType22-NB-r14}
CellSelectionInfo-NB-V1350 ::=          SEQUENCE {
    delta-RxLevMin-v1350                   INTEGER (-8..-1)
}
CellSelectionInfo-NB-v1430 ::=          SEQUENCE {
    powerClass14dBm-Offset-r14             ENUMERATED {dB-6, dB-3, dB3, dB6, dB9, dB12)        OPTIONAL,
    -- Need OP
    ce-authorisationOffset-r14             ENUMERATED {dB5, dB10, dB15, dB20, dB25, dB30, dB35}
    OPTIONAL    -- Need OP
}
-- ASN1STOP
```

In other embodiments, the indication may be put in SIB2, SIB22, any existing SIB or a new SIB.

In one embodiment, the indication may be in PRACH-Config or RACH-ConfigCommon information element for eMTC, such as in SIB2. In another embodiment, the indication may be in NPRACH-ConfigSIB-NB or RACH-ConfigCommon-NB information element for NB-IoT in SIB2-NB together with the grouping information used to configure the set of random-access preambles or subcarriers, in which the UE uses to announce it will try to use early data transmission in Msg3, i.e. the EDT indication. Such grouping information for EDT-indication does not exist in the current versions, i.e. Release 14, of the specifications, but will be introduced for Rel-15 version of the specifications. One benefit of configuring the indication together with the grouping information is that it may be tied to the UEs coverage or CE-level. That is, the use of EDT feature may be toggled on or off per UE coverage level. In some embodiments, the indication may be a flag as shown in the above ASN. 1 examples. In some embodiments, the indication may be an implicit configuration where no preambles are allocated for the EDT indication, as in that UE may not use EDT. Example ASN.1 example of explicit configuration for NB-IoT, NPRACH-ConfigSIB-NB, is given as Table 4 below.

TABLE 4

| NPRACH-ConfigSIB-NB information elements |
|---|

```
-- ASN1START
NPRACH-ConfigSIB-NB-r13 ::=         SEQUENCE {
    nprach-CP-Length-r13                ENUMERATED {us66dot7, us266dot7},
```

TABLE 4-continued

| NPRACH-ConfigSIB-NB information elements |
|---|

| | | | |
|---|---|---|---|
| rsrp-ThresholdsPrachInfoList-r13 need OR | RSRP-ThresholdsNPRACH-InfoList-NB-r13 | OPTIONAL, | -- |
| nprach-ParametersList-r13 } | NPRACH-ParametersList-NB-r13 | | |
| NPRACH-ConfigSIB-NB-v1330 ::= | SEQUENCE { | | |
| nprach-ParametersList-v1330 } | NPRACH-ParametersList-NB-v1330 | | |
| NPRACH-ConfigSIB-NB-v15xy ::= | SEQUENCE { | | |
| nprach-ParametersList-v15xy } | NPRACH-ParametersList-NB-v15xy | | |
| NPRACH-ParametersList-NB-r13 ::= Parameters-NB-r13 | SEQUENCE (SIZE (1.. maxNPRACH-Resources-NB-r13)) OF NPRACH- | | |
| NPRACH-ParametersList-NB-v1330 ::= ParameterS-NB-V1330 | SEQUENCE (SIZE (1.. maxNPRACH-Resources-NB-r13)) OF NPRACH- | | |
| NPRACH-ParametersList-NB-v15xy ::= Parameters-NB-v15xy | SEQUENCE (SIZE (1.. maxNPRACH-Resources-NB-r13)) OF NPRACH- | | |
| NPRACH-Parameters-NB-r13 ::= | SEQUENCE { | | |
| nprach-Periodicity-r13 | ENUMERATED | {ms40, ms80, ms160, ms240, ms320, ms640, ms1280, ms2560}, | |
| nprach-StartTime-r13 | ENUMERATED | {ms8, ms16, ms32, ms64, ms128, ms256, ms512, ms1024}, | |
| nprach-SubcarrierOffset-r13 | ENUMERATED | {n0, n12, n24, n36, n2, n18, n34, spare1}, | |
| nprach-NumSubcarriers-r13 | ENUMERATED | {n12, n24, n36, n48}, | |
| nprach-SubcarrierMSG3-RangeStart-r13 | ENUMERATED | {zero, oneThird, twoThird, one}, | |
| maxNumPreambleAttemptCE-r13 | ENUMERATED | {n3, n4, n5, n6, n7, n8, n10, spare1}, | |
| numRepetitionsPerPreambleAttempt-r13 | ENUMERATED | {n1, n2, n4, n8, n16, n32, n64, n128}, | |
| npdcch-NumRepetitions-RA-r13 | ENUMERATED | {r1, r2, r4, r8, r16, r32, r64, r128, r256, r512, r1024, r2048, spare4, spare3, spare2, spare1}, | |
| npdcch-StartSF-CSS-RA-r13 | ENUMERATED | {v1dot5, v2, v4, v8, v16, v32, v48, v64}, | |
| npdcch-Offset-RA-r13 } | ENUMERATED | {zero, oneEighth, oneFourth, threeEighth} | |
| NPRACH-Parameters-NB-v1330 ::= | SEQUENCE { | | |
| nprach-NumCBRA-StartSubcarriers-r13 | ENUMERATED {n8, n10, n11, n12, n20, n22, n23, n24, n32, n34, n35, n36, n40, n44, n46, n48} | | |
| } | | | |
| NPRACH-Parameters-NB-v15xy ::= | SEQUENCE { | | |
| <preamble grouping for EDT-indication, omitted> | | | |
| nprach-EDTenabled-r15 } | ENUMERATED {true} | | |
| RSRP-ThresholdsNPRACH-InfoList-NB-r13 ::= SEQUENCE (SIZE(1..2)) OF RSRP-Range | | | |
| -- ASN1STOP | | | |

In some embodiments, the indication may be UE-specific. For mobile-terminated case, the enabling/disabling of EDT feature may be UE-specific, for example by setting a flag in paging message. This may be combined with a cell-specific EDT configuration, however, the eNB may then choose to make an exception for a particular UE. The EDT indication may be included either in the paging downlink control information (DCI) or in the paging message on physical downlink shared channel (PDSCH) or (N)PDSCH for NR.

For UEs in RRC_CONNECTED, on the other hand, eNB may send a PDDCH-order and, in yet an embodiment, an EDT indication would be included in the PDCCH-order, i.e. DCI to indicate whether access using EDT is allowed for the UE. The UEs for eMTC and NB-IoT are not obliged to read system information in RRC_CONNECTED, and the EDT indication might have changed since the UE was in RRC_IDLE, or the eNB may want to make an exception for this UE.

As an alternative embodiment, the UE may be configured by dedicated signaling, e.g. RRC signaling, to be allowed to use EDT or not. In this case, the configuration may be "sticky", e.g. valid longer, such that the EDT configuration may also be valid later when the UE is in RRC_IDLE mode as long as the UE remains in the cell where configured. As an alternative to being configured until further notice, the configuration may be valid for a specified time.

As part of the UE-specific indication, not only may it be indicated that the UE is allowed to use EDT, but also the preamble/(N)PRACH resource to use for EDT may be indicated, or the preamble/(N)PRACH resource range may be indicated.

Regarding a configuration corresponding to the indication, one way of implementing the above indications is that the EDT indication may tell UEs if EDT is to be used for EDT in either Msg3 and Msg4. In another more plausible way of implementing the above indications, the EDT indication may tell UEs if it is allowed to use EDT for Msg3. In a third way of implementing the above indications, there may be separate EDT indications to tell UEs if EDT is to be used for EDT in Msg3 and Msg4.

In one embodiment, the enabling/disabling indication, i.e. the EDT indication, may be common to all CE levels. In another embodiment, the EDT indication may be differentiated per CE level, for example, such that EDT in a cell is allowed using a low number of repetitions but not using high numbers of repetition. In some embodiments, the low number of repetitions may be referred to CE level 1, and the high numbers of repetition may be referred to CE level 3.

Figure 3:
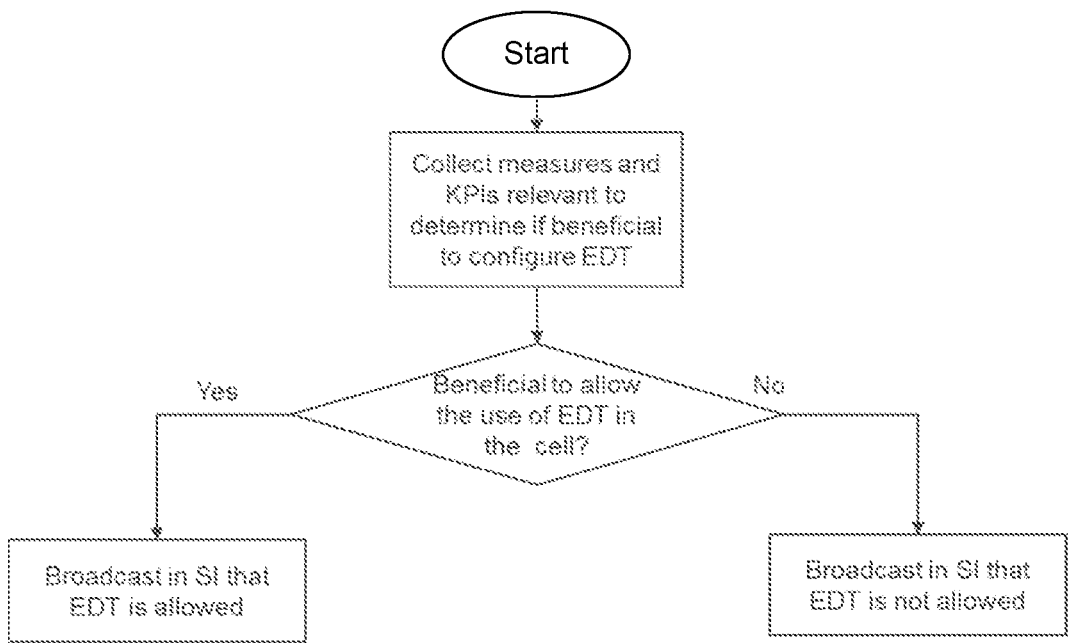
FIG. 3 illustrates a flow diagram of an example method performed at a network node, in accordance with certain embodiments.

FIG. 3 illustrates an example method performed at a network node, in accordance with certain embodiments. An eNB implementation may be to determine when eNB should allow the use of EDT in the cell. For example, this decision may be based on any combination of cell load, cell size, and a congestion or collision at the UE. In some embodiments, the cell load may comprise random assess collision rate, number of access attempts per time unit, (N)PRACH configuration and number of preambles allocated, and any newly introduced or existing feedback from the UE, such as reporting the number of RA re-attempts before RA is concluded to be successful. In some embodiments, the cell size may be a maximum converge enhancement configured in the cell.

Note the above description is with regards to the ongoing Release 15 work on NB-IoT and eMTC. The methods disclosed in the present disclosure may however be generalized to any type of contention-based transmission of data and enabling/disabling such functionality depending on e.g. the load in the cell. In some embodiments, the methods in the present disclosure may be generalized to New Radio (NR), ultra-low latency (URLLC), and the objectives in work items in 3GPP Release 16.

For NR, working on URLLC and also for Release 16 eMTC and NB-IoT, the methods disclosed in the present disclosure may be applied to non-orthogonal multiple access (NOMA) schemes, i.e. an overloading of physical resources to be able to multiplex a greater number of UEs to increase the capacity. One example is the Sparse Code Multiple Access (SCMA) but there are several more candidate schemes. In these schemes, it is often assumed that the transmission of the data payload uses common resources and is transmitted in Msg3 or even in Msg1 at the risk of collision, i.e. contention-based transmission. Therefore, the methods disclosed in the present disclosure may be equally applicable to such case and it may be of interest to disable the use of such methods in the cell or for UEs, e.g. at high load.

Figure 4:
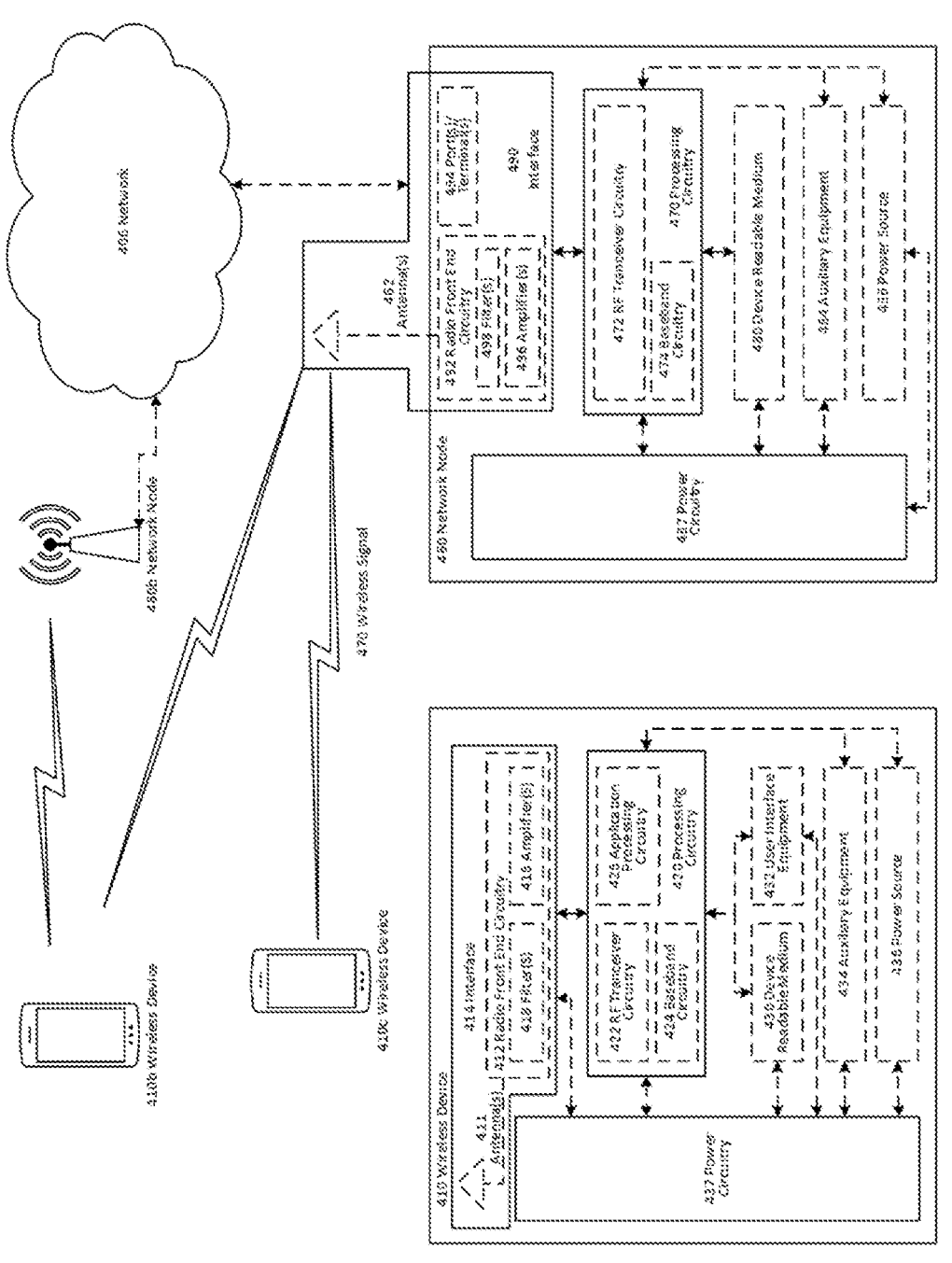
FIG. 4 illustrates an example wireless network, according to certain embodiments.

FIG. 4 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and wireless devices (WDs) 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. In certain embodiments, the network node 460 may be the network node which is further depicted in FIG. 16. In some embodiments, the network node 460 may be a base station, such as gNB. In certain embodiments, the wireless device 410 may be a user equipment, which is further illustrated in FIG. 15. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 488, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination. In particular embodiments, the processing circuitry 470 of the network node 460 may perform the methods, which are further illustrated in FIG. 14.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460 but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487.

The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 410 may be a user equipment which is further depicted in FIG. 15. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein. In particular embodiments, the processing circuitry 420 of the wireless device 410 may perform the method which is further illustrated in FIG. 13.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionalities described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
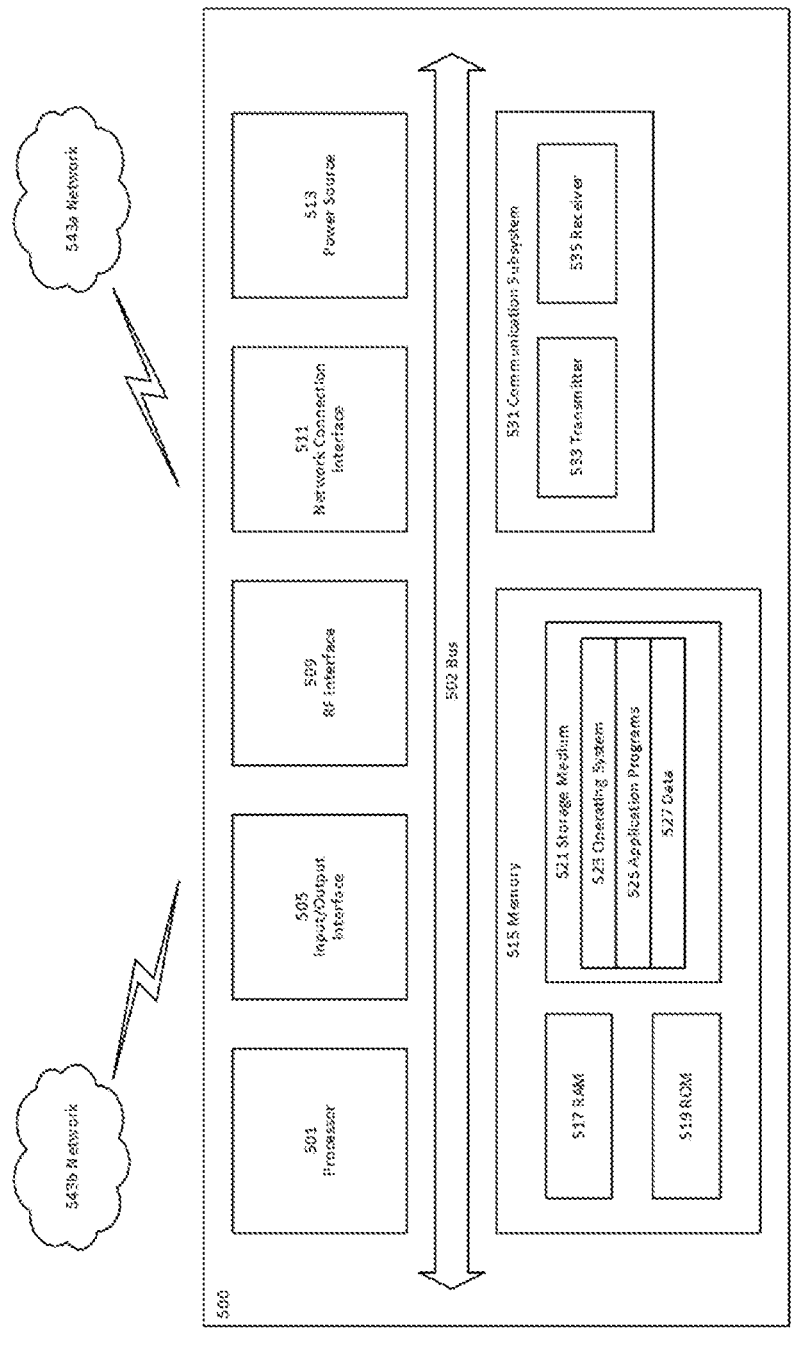
FIG. 5 illustrates an example user equipment, according to certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the 3rd Generation Partnership Project (3GPP), including a NB-IoT UE, a MTC UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 500 may be a user equipment which is further depicted in FIG. 15. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer. In certain embodiment, processing circuitry 501 may perform the method which is further illustrated in FIG. 13.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
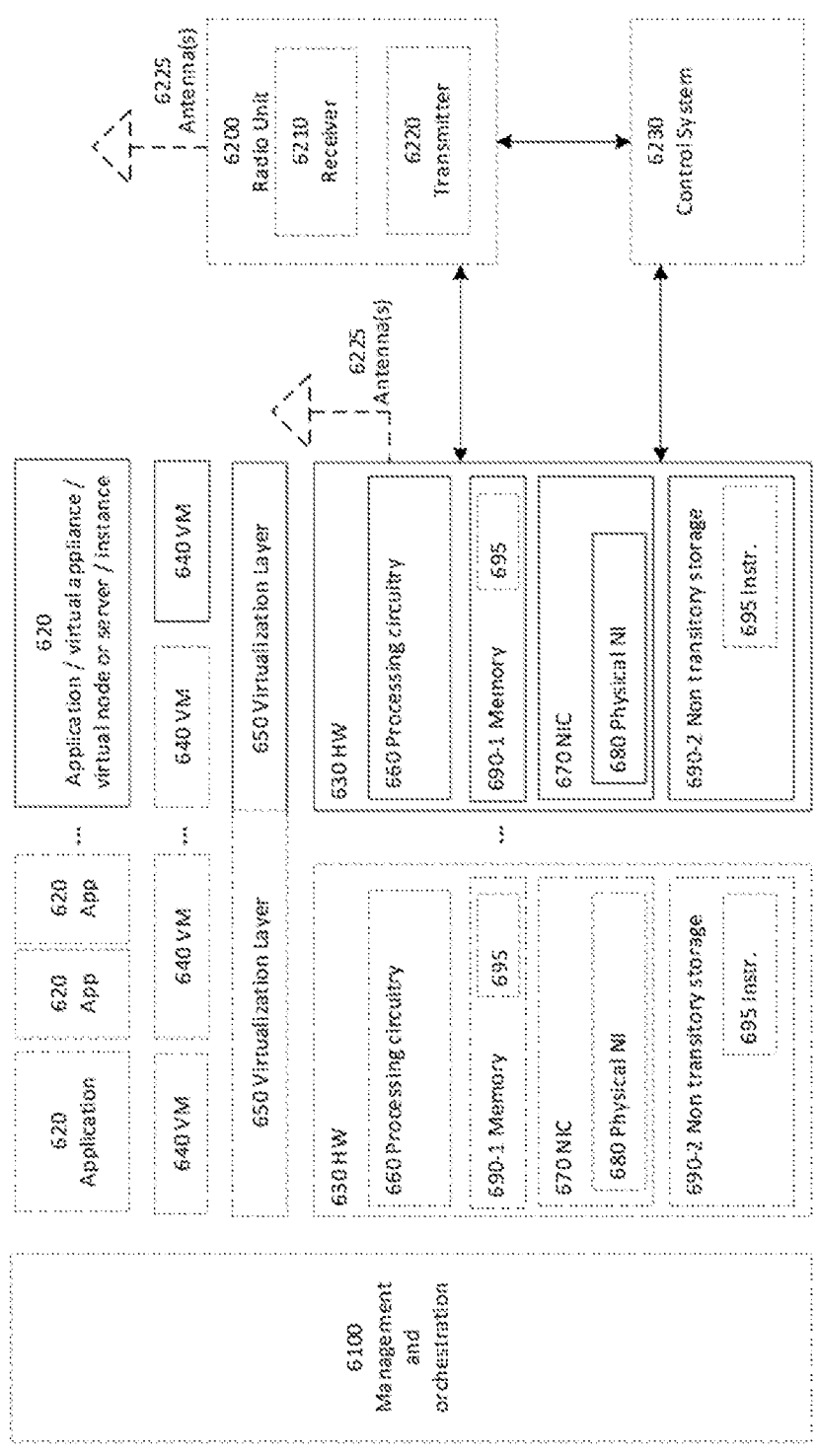
FIG. 6 illustrates an example virtualization environment, according to certain embodiments.

FIG. 6 illustrates an example virtualization environment, according to certain embodiments. FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be affected with the use of control system 6230 which may alternatively be used for communication between the hardware nodes 630 and radio units 6200.

Figure 7:
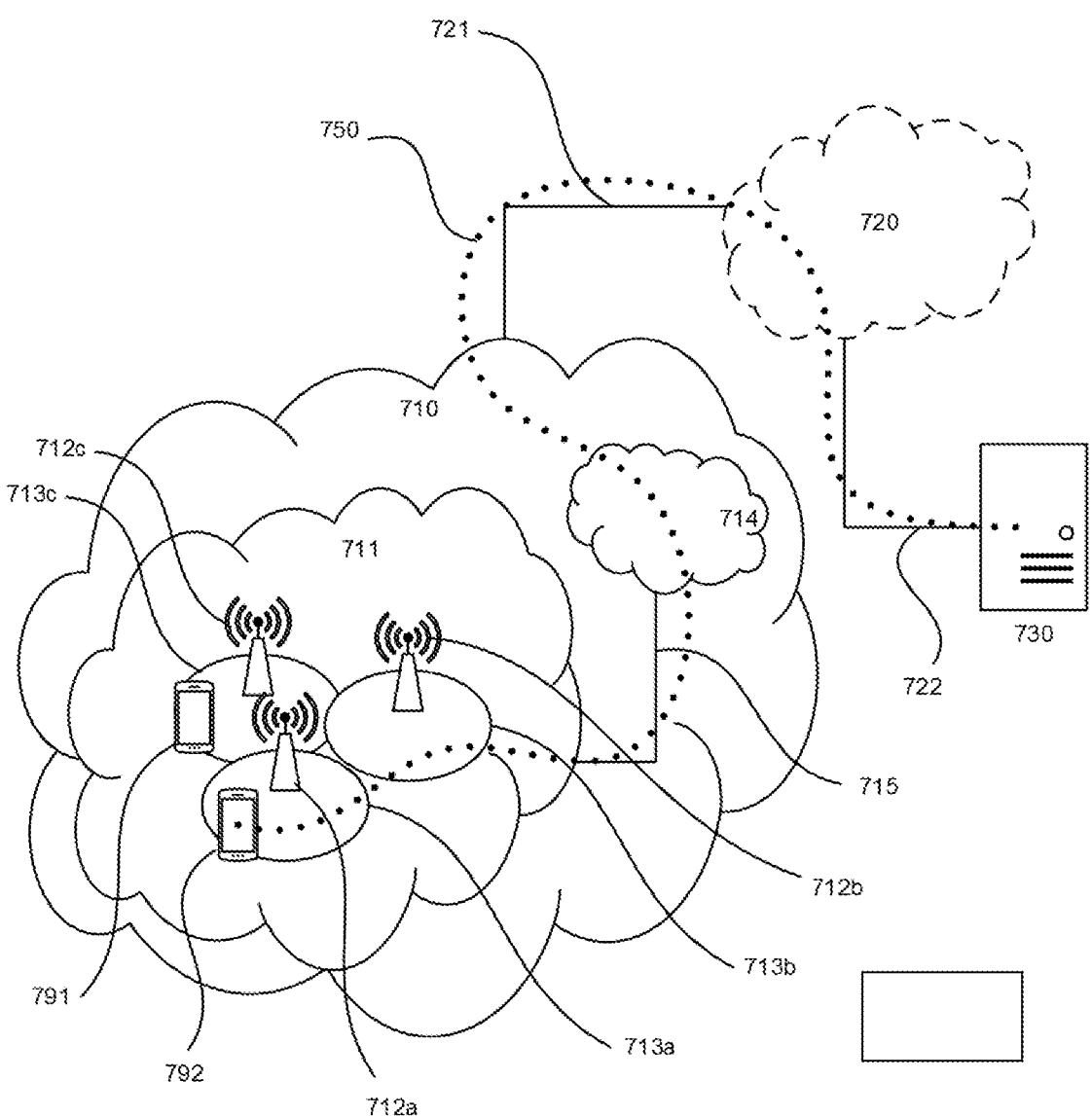
FIG. 7 illustrates an example telecommunication network connected via an intermediate network to a host computer, according to certain embodiments.

FIG. 7 illustrates an example telecommunication network connected via an intermediate network to a host computer, according to certain embodiments. With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712. In certain embodiments, the plurality of UEs 791, 792 may be the user equipment as described with respect to FIG. 15.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
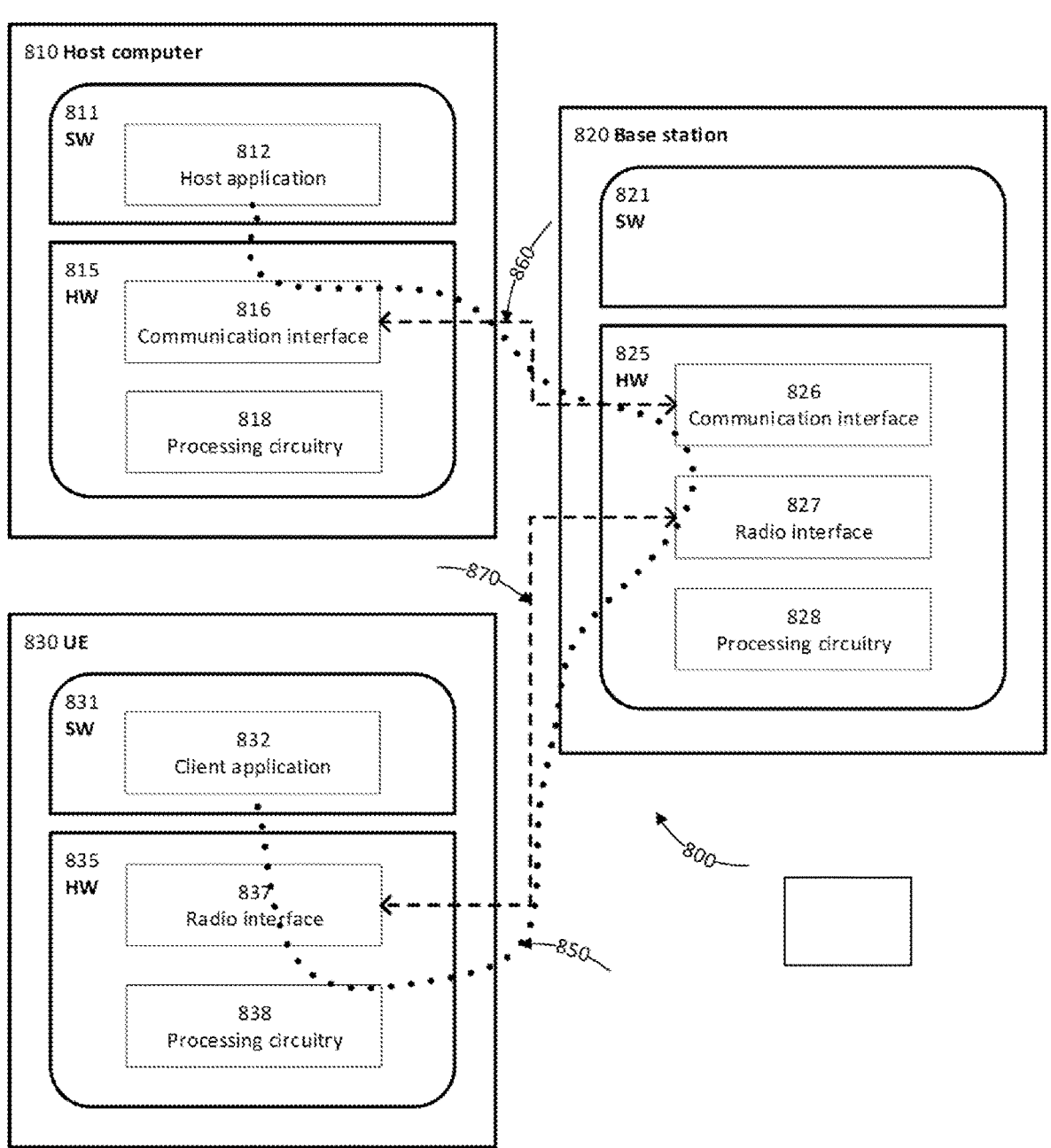
FIG. 8 illustrates an example host computer communicating via a base station with a user equipment over a partially wireless connection, according to certain embodiments.

FIG. 8 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. In certain embodiments, the base station 820 may be a network node as described with respect to FIG. 16. Hardware 825 may include communi-cation interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. In certain embodiments, the UE 830 may be the user equipment as described with respect to FIG. 15. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
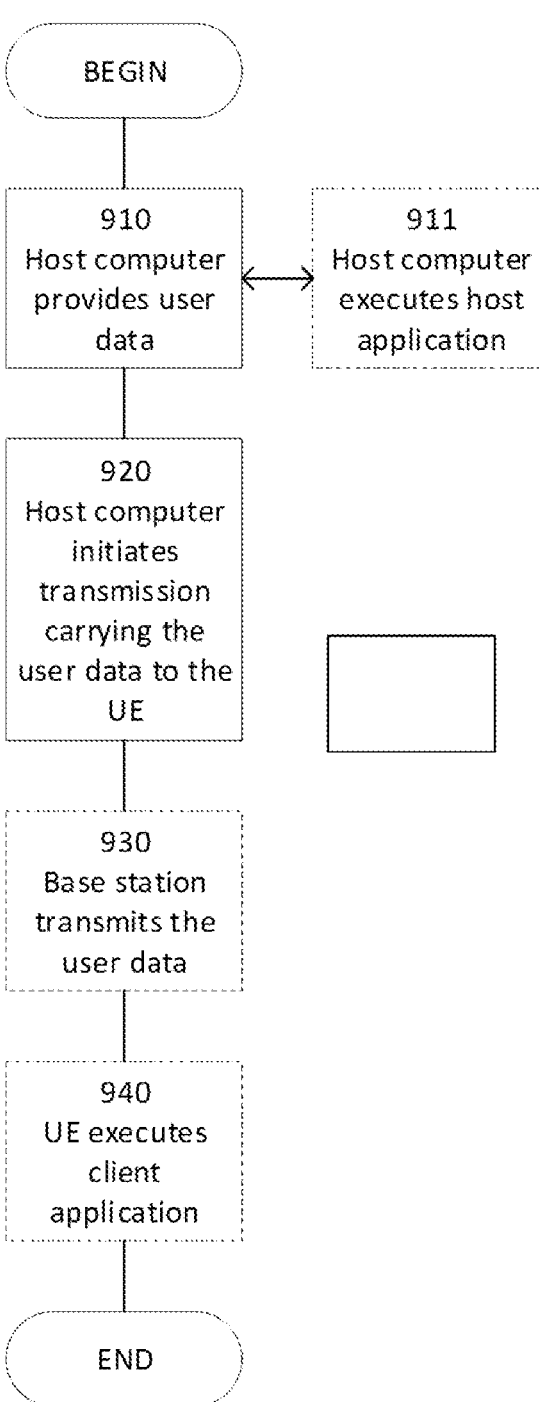
FIG. 9 illustrates an example method implemented in a communication system including a host computer, a base station and a user equipment, according to certain embodiments.

FIG. 9 illustrates an example method implemented in a communication system including a host computer, a base station and a user equipment, according to certain embodiments in accordance with some embodiments. More specifically, FIG. 9 is a flowchart illustrating a method implemented in a communication system, in accordance with one embodiment. The communication system includes a host computer, a base station and a UE which may be a user equipment described with reference to FIG. 15. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
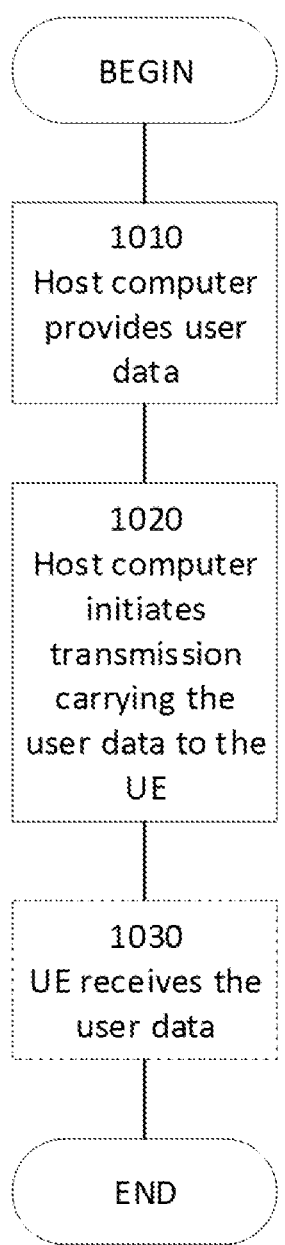
FIG. 10 illustrates another example method implemented in a communication system including a host computer, a base station and a user equipment, according to certain embodiments.

FIG. 10 illustrates an example method implemented in a communication system including a host computer, a base station and a user equipment, in accordance with some embodiments. More specifically, FIG. 10 is a flowchart illustrating a method implemented in a communication system, in accordance with one embodiment. The communication system includes a host computer, a base station and a UE which may be a user equipment described with reference to FIG. 15. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
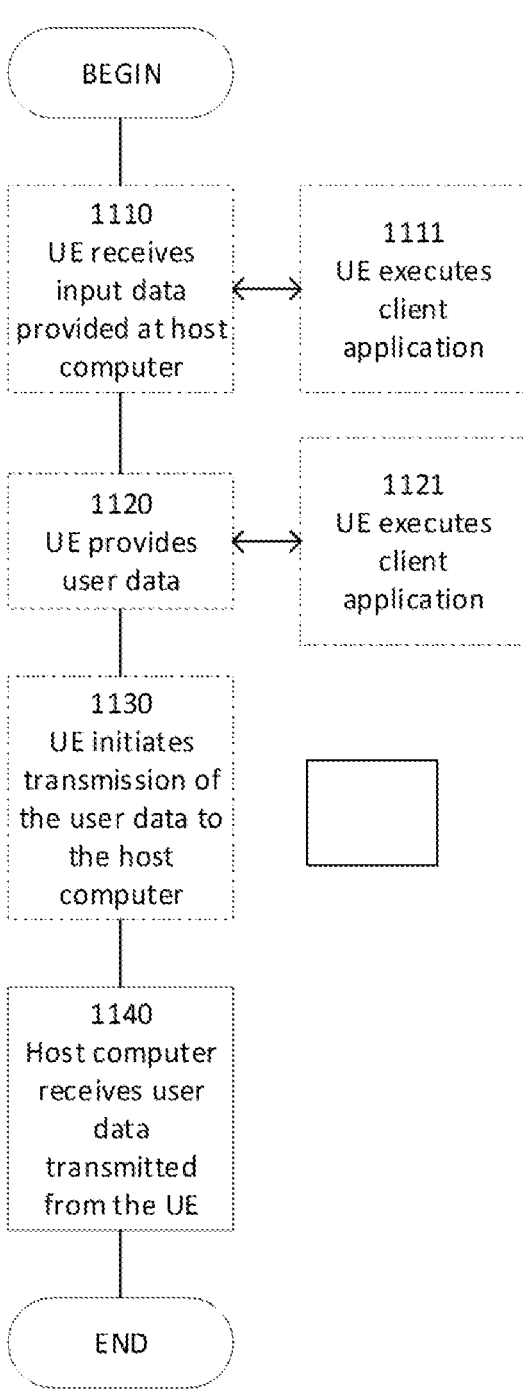
FIG. 11 illustrates another further example method implemented in a communication system including a host computer, a base station and a user equipment, according to certain embodiments.

FIG. 11 illustrates another further example method implemented in a communication system including a host computer, a base station and a user equipment, in accordance with some embodiments. More specifically, FIG. 11 is a flowchart illustrating a method implemented in a communication system, in accordance with one embodiment. The communication system includes a host computer, a base station and a UE which may be a user equipment described with reference to FIG. 15. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
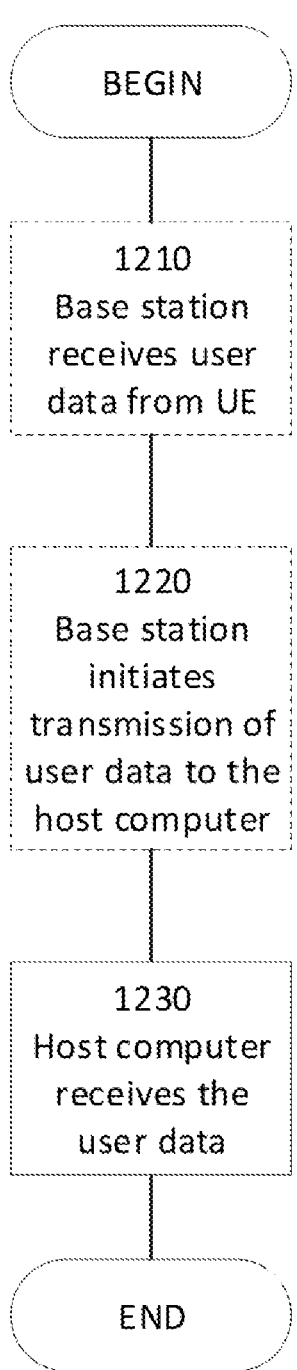
FIG. 12 illustrates another yet example method implemented in a communication system including a host computer, a base station and a user equipment, according to certain embodiments.

FIG. 12 illustrates another example method implemented in a communication system including a host computer, a base station and a user equipment, in accordance with some embodiments. More specifically, FIG. 12 is a flowchart illustrating a method implemented in a communication system, in accordance with one embodiment. The communication system includes a host computer, a base station and a UE which may be a user equipment described with reference to FIG. 15. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
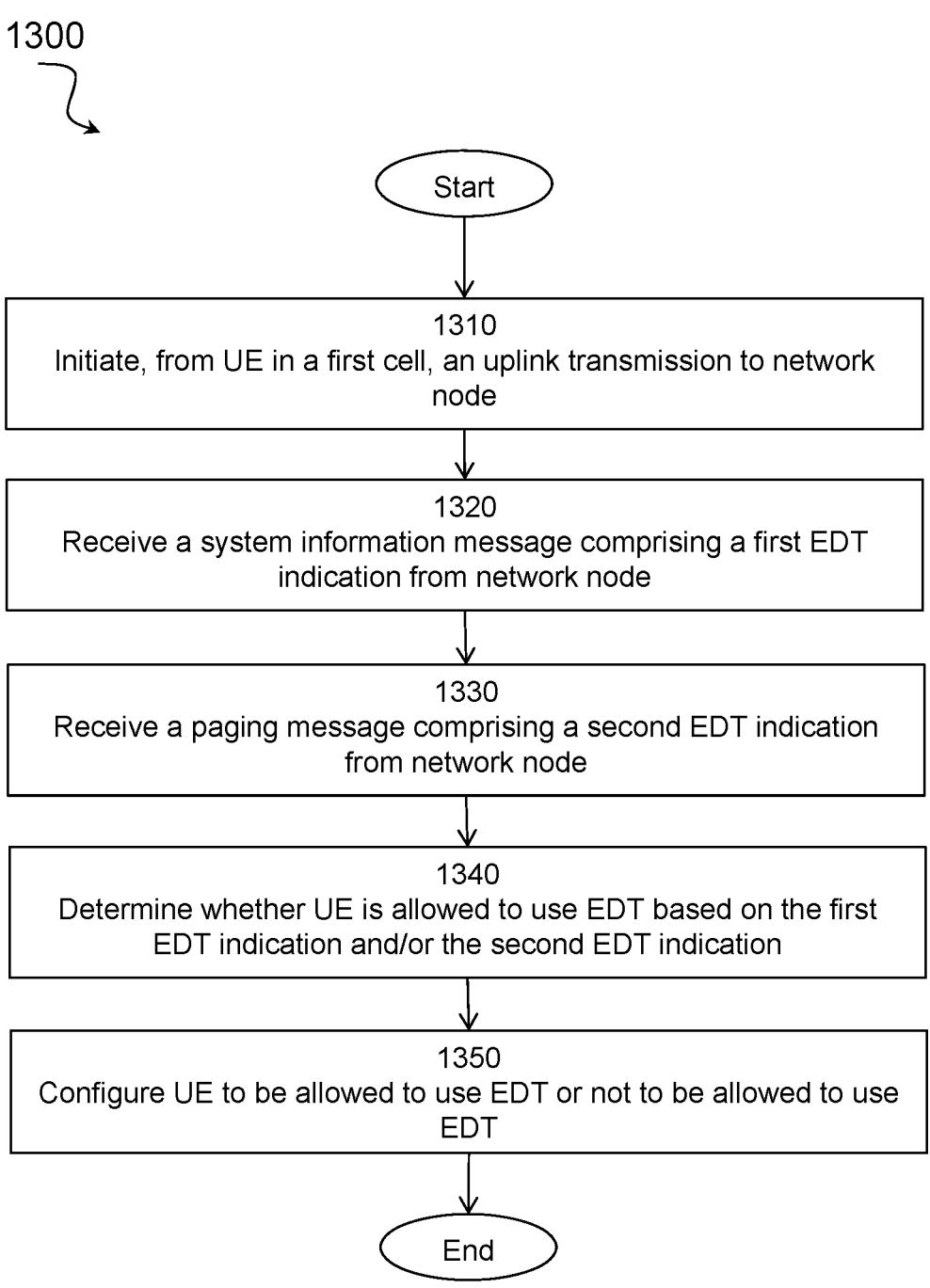
FIG. 13 illustrates a flow diagram of an example method, in accordance with certain embodiments.

FIG. 13 is a flow diagram of an example method, in accordance with certain embodiments. The method may be performed by a UE or a WD. Method 1300 begins at step 1310 with initiating, from a UE in a first cell, an uplink transmission to a network node. The user equipment may be the wireless device depicted in FIG. 4 or the user equipment shown in FIG. 5. The network node may be the network node depicted in FIG. 4.

At step 1320, the method 1300 receives a system information message comprising a first EDT indication from the network. In addition, at step 1330, the method 1300 further receives a paging message comprising a second EDT indication. In some embodiments, the first EDT indication may be cell-specific and apply to UEs in the first cell. In some embodiments, the second EDT indication may be UE-specific. The second EDT indication is used to instruct whether a specific UE is allowed to use EDT. In some embodiments, the first EDT indication may be grouped with access barring information. In some embodiments, the first EDT indication may be added in a system information message. In some embodiments, the first EDT indication may be added in System Information Block Type 14 (SIB14), SIB1, SIB2, SIB22, an existing SIB, a new SIB or Master Information Block (MIB). In some embodiments, the first EDT indication may be added in PRACH-Config, RACH-ConfigCommon, NPRACH-ConfigSIB-NB, or RACH-ConfigCommon-NB information element.

Furthermore, in certain embodiments, the first EDT indication may comprise grouping information, wherein the grouping information is used to configure a set of random access preambles indicated in the first EDT indication.

At step 1340, the method 1300 determines whether UE is allowed to use EDT based on the first EDT indication and/or the second EDT indication. In certain embodiments, EDT may be used to transmit data prior to completing an access procedure. In certain embodiments, the first EDT indication may comprise a configuration in which no preambles are allocated for the first EDT indication, e.g. when the UE is not allowed to use EDT. In some embodiments, the second EDT indication may comprise a flag combined with a cell-specific EDT configuration, wherein the cell-specific EDT configuration is being overridden when the specific UE is indicated. In some embodiments, the second EDT indication may instruct the UE to use EDT for a specific period of time. In some embodiments, the second EDT indication may instruct a specific preamble or a resource to use for EDT. In some embodiments, the first EDT indication and/or the second EDT indication may instruct the UE to use EDT in Msg3, Msg4, or both Msg3 and Msg4.

At step 1350, the method 1300 configures the UE to be allowed to use EDT or not to be allowed to use EDT. In some embodiments, the UE may further receive an EDT configuration which is used to configure the UE to use EDT or not.

In some embodiments, the EDT configuration may be valid as long as the UE is in a cell where the UE was configured, e.g. in the first cell.

Figure 14:
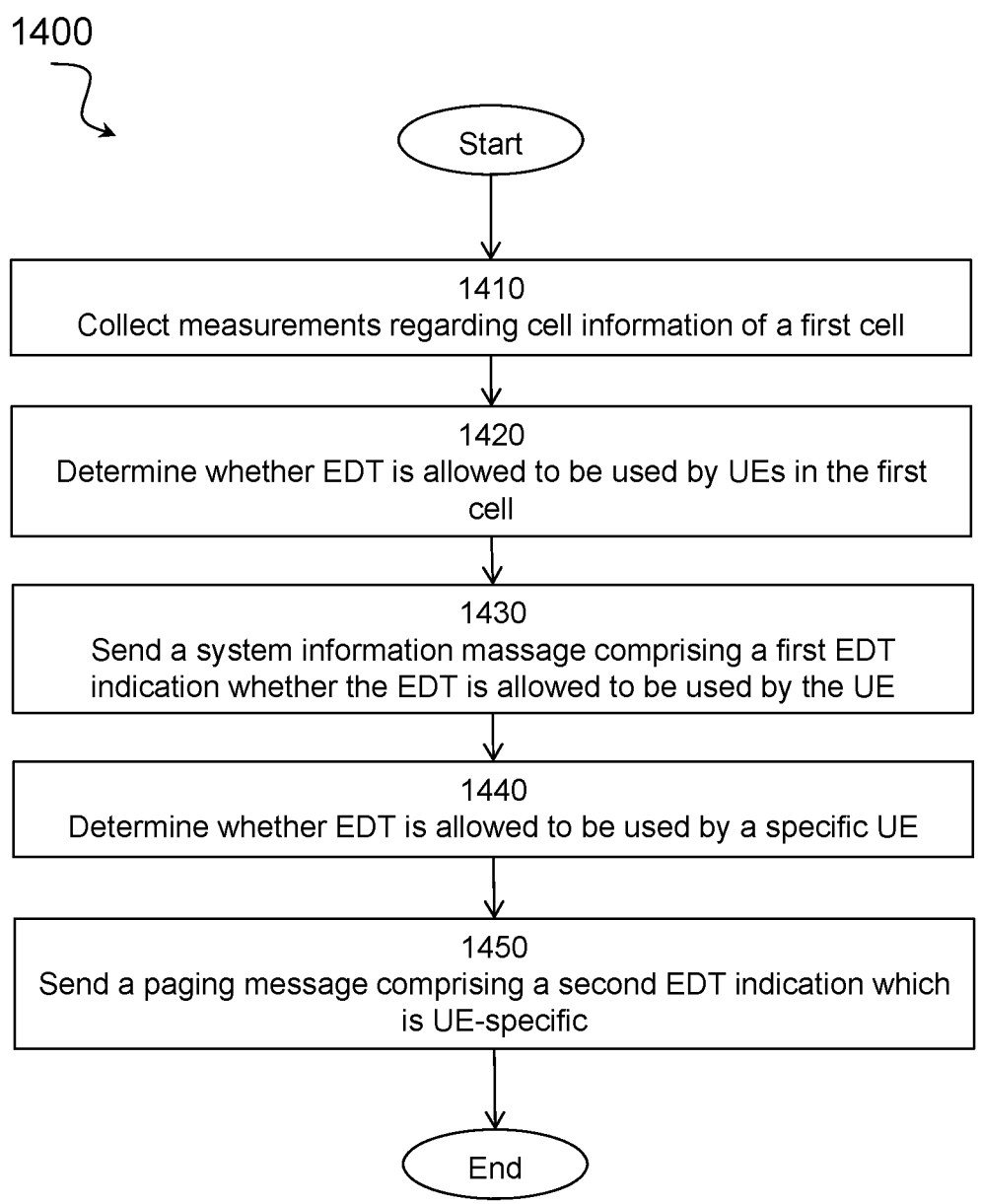
FIG. 14 illustrates a flow diagram of another example method, in accordance with certain embodiments.

FIG. 14 is a flow diagram of another example method, in accordance with certain embodiments. The method may be performed by a network node or a base station. The network node may be the network node depicted in FIG. 4. The base station may be the base station depicted in FIGS. 7 and 8. Method 1400 begins at step 1410 with collecting measurements regarding cell information of a first cell. In certain embodiments, the measurements may be related to a cell load, a cell size, and a congestion at the UE. In certain embodiments, the measurements may be related to a random access collision rate, a number of access attempts per a time unit, a physical random access channel (PRACH) configuration, a number of preambles allocated, a new update from the UE, an existing update from the UE, a maximum coverage enhancement configured in a cell, and a collision of a UE-specific subcarrier.

At step 1420, the method 1400 determines whether EDT is allowed to be used by UEs in the first cell based on the collected measurements. If it is beneficial to allow UEs to use EDT in the cell, broadcast in the system information that EDT is allowed. If it is not beneficial to allow UEs to use EDT in the cell, broadcast in system information that EDT is not allowed. In certain embodiments, EDT may be used to transmit data prior to completing an access procedure.

At step 1430, the method 1400 sends, to the UEs in the first cell, a system information message comprising a first EDT indication whether EDT is allowed to be used by the UEs in the first cell. In some embodiments, the first EDT indication may be generated based on the measurements collected at step 1410. In some embodiments, the first EDT indication may be generated based on the determination processed by the step 1420. In some embodiments, the first EDT indication may be a cell-specific. In some embodiments, the first EDT indication may be grouped with access barring information. In some embodiments, the first EDT indication may be added in a system information message. In some embodiments, the first EDT indication may be added in System Information Block Type 14 (SIB14), SIB1, SIB2, SIB22, an existing SIB, a new SIB or Master Information Block (MIB). In some embodiments, the first EDT indication may be added in PRACH-Config, RACH-ConfigCommon, NPRACH-ConfigSIB-NB, or RACH-Config-Common-NB information element.

Furthermore, in certain embodiments, the first EDT indication may comprise grouping information, wherein the grouping information is used to configure a set of random access preambles indicated in the first EDT indication. In certain embodiments, the first EDT indication may comprise a configuration in which no preambles are allocated for the first EDT indication, e.g. when the UE is not allowed to use EDT. In some embodiments, the first EDT indication may instruct a specific period of time using EDT. In some embodiments, the first EDT indication may instruct a specific preamble or a resource to use for EDT. In some embodiments, the first EDT indication may instruct the UE to use EDT in Msg3, Msg4, or both Msg3 and Msg4.

At step 1440, the method 1400 may further determine whether EDT is allowed to be used by a specific UE. In some embodiments, the network node may make an exception for a particular UE at the network's discretion or a user's discretion.

At step 1450, in certain embodiments, the method 1400 further sends a paging message comprising a second EDT indication which is UE-specific. The second EDT indication is used to instruct whether a specific UE is allowed to use EDT. When the specific UE is indicated, a cell-specific EDT configuration is being overridden. In some embodiments, the second EDT indication comprises a flag combined with a cell-specific EDT configuration. In some embodiments, the method 1400 may further send an EDT configuration which is used to configure the UE to use EDT or not. In some embodiments, the EDT configuration may be valid as long as the UE is in a cell where the UE was configured. The first EDT indication and the second EDT indication may be interchangeable and be applied in any one of the above scenarios.

Figure 15:
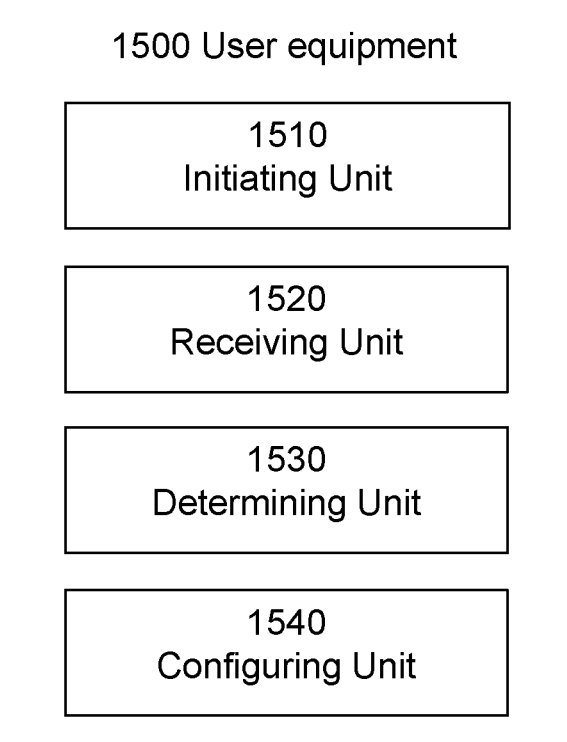
FIG. 15 illustrates a block schematic of an example user equipment, in accordance with certain embodiments.

FIG. 15 is a schematic block diagram of an exemplary user equipment 1500, in accordance with certain embodiments. The user equipment 1500 may be used in a wireless network, e.g. the wireless network 406 shown in FIG. 4. In certain embodiments, the user equipment 1500 may be implemented in a wireless device 410 shown in FIG. 4. The user equipment 1500 is operable to carry out the example method described with reference to FIG. 13 and possibly any other processes or methods disclosed herein. It is also to be understood that the method in FIG. 13 are not necessarily carried out solely by user equipment 1500. At least some operations of the method can be performed by one or more other entities.

User equipment 1500 may comprise processing circuitry, which may include one or more microprocessor or micro-controllers, as well as other digital hardware, which may include digital signal processors (DSPs), special-purpose digital logic, and the like. In some embodiments, the processing circuitry of user equipment 1500 may be the processing circuitry 420 shown in FIG. 4. In some embodiments, the processing circuitry of user equipment 1500 may be the processor 501 shown in FIG. 5. The processing circuitry may be configured to execute program code stored in memory 515 shown in FIG. 5, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause applying unit 1510, receiving unit 1520, determining unit 1530, and acquiring unit 1540, and any other suitable units of user equipment 1500 to perform corresponding functions according one or more embodiments of the present disclosure, such as a transmitter and a receiver.

As illustrated in FIG. 15, user equipment 1500 includes initiating unit 1510, receiving unit 1520, determining unit 1530, and configuring unit 1540. The initiating unit 1510 may be configured to initiate an uplink transmission to a network node. In some embodiments, the UE may be in a first cell.

The receiving unit 1520 may be configured to receive a system information message comprising a first EDT indication from the network node. In addition, the receiving unit 1520 further receives a paging message comprising a second EDT indication. In some embodiments, the first EDT indication may be cell-specific and applies to UEs in the first cell. In some embodiments, the second EDT indication may be UE-specific. The second EDT indication is used to instruct whether a specific UE is allowed to use EDT. In some embodiments, the first EDT indication may be grouped with access barring information. In some embodiments, the first EDT indication may be added in a system information message. In some embodiments, the first EDT indication may be added in System Information Block Type 14 (SIB14), SIB1, SIB2, SIB22, an existing SIB, a new SIB or Master Information Block (MIB). In some embodiments, the first EDT indication may be added in PRACH-Config, RACH-ConfigCommon, NPRACH-ConfigSIB-NB, or RACH-ConfigCommon-NB information element.

Furthermore, in certain embodiments, the first EDT indication may comprise grouping information, wherein the grouping information is used to configure a set of random access preambles indicated in the first EDT indication.

The determining unit 1530 may be configured to determine whether the UE is allowed to use EDT based on the first EDT indication and/or the second EDT indication. In certain embodiments, EDT may be used to transmit data prior to completing an access procedure. In certain embodiments, the first EDT indication may comprise a configuration in which no preambles are allocated for the first EDT indication, e.g. when the UE is not allowed to use EDT. In some embodiments, the second EDT indication comprises a flag combined with a cell-specific EDT configuration, wherein the cell-specific EDT configuration is being overridden when the specific UE is indicated. In some embodiments, the UE may be instructed by the second EDT indication to use EDT for a specific period of time. In some embodiments, the UE may be instructed by the second EDT indication to use a specific preamble or a resource for EDT. In some embodiments, the first EDT indication and/or the second EDT indication may instruct the UE to use EDT in Msg3, Msg4, or both Msg3 and Msg4.

The configuring unit 1540 may be configured to configure the UE to be allowed to use EDT or not to be allowed to use EDT. In some embodiments, the UE may further receive an EDT configuration which is used to configure the UE to use EDT or not. In some embodiments, the EDT configuration may be valid as long as the UE is in a cell where the UE was configured, e.g. in the first cell.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

Figure 16:
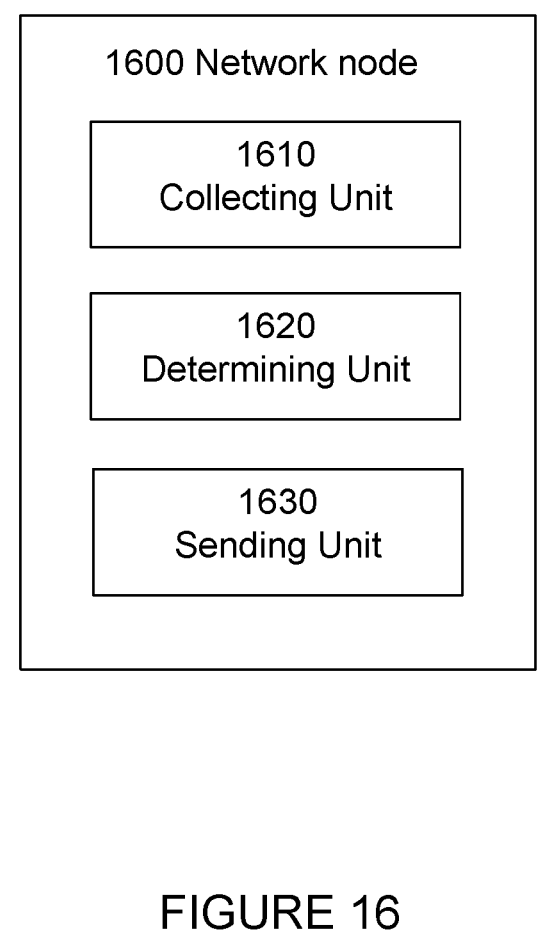

FIG. 16 is a schematic block diagram of an exemplary network node 1600 in a wireless network, in accordance with certain embodiments. In some embodiments, the wireless network may be the wireless network 406 shown in FIG. 4. The network node may be implemented in a wireless device (e.g., wireless device 410 shown in FIG. 4). The network node 1600 is operable to carry out the example method described with reference to FIG. 14 and possibly any other processes or methods disclosed herein. It is also to be understood that the method of FIG. 14 is not necessarily carried out solely by the network node 1600. At least some operations of the method can be performed by one or more other entities.

Network node 1600 may comprise processing circuitry, which may include one or more microprocessor or micro-controllers, as well as other digital hardware, which may include digital signal processors (DSPs), special-purpose digital logic, and the like. In some embodiments, the processing circuitry of the network node 1600 may be the processing circuitry 470 shown in FIG. 4. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause identifying unit 1610, generating unit 1620, sending unit 1630, and providing unit 1640, and any other suitable units of network node 1600 to perform corresponding functions according one or more embodiments of the present disclosure, such as a receiver and a transmitter.

As illustrated in FIG. 16, network node 1600 includes collecting unit 1610, determining unit 1620, and sending unit 1640. Collecting unit 1610 may be configured to collect measurements regarding cell information of a first cell. In certain embodiments, the measurements may be related to a cell load, a cell size, and a congestion at the UE. In certain embodiments, the measurements may be related to a random access collision rate, a number of access attempts per a time unit, a physical random access channel (PRACH) configuration, a number of preambles allocated, a new update from the UE, an existing update from the UE, a maximum coverage enhancement configured in a cell, and a collision of a UE-specific subcarrier.

The determining unit 1620 may be configured to determine whether EDT is allowed to be used by UEs in the first cell based on the collected measurements. If it is beneficial to allow the UE to use EDT in the cell, broadcast in the system information that EDT is allowed. If it is not beneficial to allow the UE to use EDT in the cell, broadcast in system information that EDT is not allowed. In certain embodiments, EDT may be used to transmit data prior to completing an access procedure.

The sending unit 1630 may be configured to send a system information message comprising a first EDT indication whether EDT is allowed to be used by the UEs in the first cell. In some embodiments, the first EDT indication may be generated based on the measurements collected by the collecting unit 1620. In some embodiments, the first EDT indication may be generated based on the determination processed by the determining unit 1620. In some embodiments, the first EDT indication may be a cell-specific. In some embodiments, the first EDT indication may be grouped with access barring information. In some embodiments, the first EDT indication may be added in a system information message. In some embodiments, the first EDT indication may be added in System Information Block Type 14 (SIB14), SIB1, SIB2, SIB22, an existing SIB, a new SIB or Master Information Block (MIB). In some embodiments, the first EDT indication may be added in PRACH-Config, RACH-ConfigCommon, NPRACH-ConfigSIB-NB, or RACH-ConfigCommon-NB information element.

Furthermore, in certain embodiments, the first EDT indication may comprise grouping information, wherein the grouping information is used to configure a set of random access preambles indicated in the first EDT indication. In certain embodiments, the first EDT indication may comprise a configuration in which no preambles are allocated for the first EDT indication, e.g. when the UE is not allowed to use EDT. In some embodiments, the first EDT indication may instruct a specific period of time using EDT. In some embodiments, the first EDT indication may instruct a specific preamble or a resource to use for EDT. In some embodiments, the first EDT indication may instruct the UE to use EDT in Msg3, Msg4, or both Msg3 and Msg4.

The determining unit 1620 may be configured to further determine whether EDT is allowed to be used by a specific UE. In some embodiments, the determining unit 1620 of the network node 1600 may make an exception for a particular UE at the network's discretion or a user's discretion.

The sending unit 1630 may be configured to further send a paging message comprising a second EDT indication which is UE-specific based on the collected measurements. The second EDT indication is used to instruct whether a specific UE is allowed to use EDT. When the specific UE is indicated, a cell-specific EDT configuration is being overridden. In some embodiments, the second EDT indication comprises a flag combined with a cell-specific EDT configuration. In some embodiments, the method 1400 may further send an EDT configuration which is used to configure the UE to use EDT or not. In some embodiments, the EDT configuration may be valid as long as the UE is in a cell where the UE was configured. The first EDT indication and the second EDT indication may be interchangeable and be applied in any one of the above scenarios.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that enabling or disabling EDT for a UE by including an EDT indication in messages based on cell information, so that the network may avoid a resource waste caused by an early indication in Msg1 or a larger uplink grant in Msg2. Furthermore, because the EDT indication in the present disclosure may also be generated based on UE information, such as a UE CE level, particular embodiments may prevent possible congestion at the UE and improve the network performance.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for early data transmission at a user equipment comprising:
   initiating, from a user equipment (UE), a transmission to a network node, wherein the UE is in a first cell;
   receiving a first system information block (SIB) message comprising a first early data transmission (EDT) indication from the network node, the EDT indication received prior to participating in an access procedure; and
   determining whether the UE is allowed to use EDT to transmit data prior to completing the access procedure based on the first EDT indication, wherein the first EDT indication is cell-specific and applies to UEs in the first cell.

2. The method according to claim 1, further comprising receiving a second message comprising a second EDT indication, wherein the second EDT indication is UE-specific and instructs whether the UE is allowed to use EDT.

3. The method according to claim 2, wherein the second EDT indication comprises a flag combined with a cell-specific EDT configuration.

4. The method according to claim 1, wherein the first EDT indication is grouped with access barring information.

5. The method according to claim 1, wherein the first EDT indication is added in System Information Block Type 14 (SIB14), SIB1, SIB2, SIB22, an existing SIB, a new SIB, or Master Information Block (MIB).

6. The method according to claim 1, wherein the first EDT indication comprises grouping information, wherein the grouping information is used to configure a set of random access preambles indicated in the first EDT indication.

7. The method according to claim 1, wherein the first EDT indication comprises a configuration in which no preambles are allocated for the first EDT indication.

8. The method according to claim 1, further comprising:
   receiving an EDT configuration in response to determining whether the UE is allowed to use EDT; and
   configuring the UE based on the EDT configuration.

9. A method for early data transmission at a network node comprising:
   collecting measurements regarding cell information of a first cell;
   determining whether early data transmission (EDT) is allowed to be used by user equipments (UEs) in the first cell to transmit data prior to completing an access procedure based on the collected measurements; and
   sending, to the UEs in the first cell, a first system information block message comprising a first EDT indication instructing whether EDT is allowed to be used by the UEs in the first cell to transmit data prior to completing the access procedure in response to the determination, the EDT indication sent a specific UE prior to the specific UE participating in an access procedure.

10. The method according to claim 9, further comprising sending a second message comprising a second EDT indication generated based on the collected measurements, wherein the second EDT indication is UE-specific and instructs whether a specific UE is allowed to use EDT.

11. The method according to claim 10, wherein the second EDT indication is added in a paging message.

12. The method according to claim 9, wherein the first EDT indication is grouped with access barring information.

13. The method according to claim 9, further comprising sending, to the UEs in the first cell, an EDT configuration in response to the determination.

14. A user equipment for early data transmission, comprising:
   at least one processing circuitry; and
   at least one storage that stores processor-executable instructions, when executed by the processing circuitry, causes a user equipment to:
      initiate a transmission to a network node, wherein the UE is in a first cell;
      receive a first system information block (SIB) message comprising a first early data transmission (EDT)

indication from the network node, the EDT indication received prior to participating in an access procedure; and
      determine whether EDT is allowed to be used to transmit data prior to completing an access procedure in the first cell based on the first EDT indication, wherein the first EDT indication is cell-specific and applies to UEs in the first cell.

15. The user equipment according to claim 14, wherein the instructions further cause the user equipment to receive a second message comprising a second EDT indication, wherein the second EDT indication is UE-specific and instructs whether EDT is allowed to be used by the UE.

16. The user equipment according to claim 15, wherein the second EDT indication comprises a flag combined with a cell-specific EDT configuration.

17. The user equipment according to claim 14, wherein the first EDT indication is grouped with access barring information.

18. The user equipment according to claim 14, wherein the first EDT indication is added in System Information Block Type 14 (SIB14), SIB1, SIB2, SIB22, an existing SIB, a new SIB, or Master Information Block (MIB).

19. The user equipment according to claim 14, wherein the first EDT indication comprises grouping information, wherein the grouping information is used to configure a set of random access preambles indicated in the first EDT indication.

20. The user equipment according to claim 14, wherein the first EDT indication comprises a configuration in which no preambles are allocated for the first EDT indication.

21. The user equipment according to claim 14, wherein the instructions further cause the user equipment to:
   receiving an EDT configuration in response to determining whether EDT is allowed to be used in the first cell based on the first EDT indication; and
   being configured based on the EDT configuration.

22. A network node for early data transmission, comprising:
   at least one processing circuitry; and
   at least one storage that stores processor-executable instructions, when executed by the processing circuitry, causes a network node to:
      collect measurements regarding cell information of a first cell;
      determine whether early data transmission (EDT) is allowed to be used by user equipments (UEs) in the first cell to transmit data prior to completing an access procedure based on the collected measurements; and
      send, to the UEs in the first cell, a first system information block message comprising a first EDT indication instructing whether EDT is allowed to be used by the UEs in the first cell to transmit data prior to completing the access procedure in response to the determination, the EDT indication sent a specific UE prior to the specific UE participating in an access procedure.

23. The network node according to claim 22, wherein the instructions further cause the network node to send a second message comprising a second EDT indication based on the collected measurements, wherein the second EDT indication is UE-specific and instructs whether a specific UE is allowed to use EDT.

24. The network node according to claim 23, wherein the second EDT indication is added in a paging message.

25. The network node according to claim 22, wherein the first EDT indication is grouped with access barring information.

26. The network node according to claim 22, wherein the instructions further cause the network node to send, to the UEs in the first cell, an EDT configuration in response to the determination.

* * * * *